US005644349A

United States Patent [19]

Martin

[11] Patent Number: 5,644,349

[45] Date of Patent: Jul. 1, 1997

[54] MECHANICAL CAPACITOR

[75] Inventor: Russel A. Martin, Menlo Park, Calif.

[73] Assignee: Xerox Corporation, Stamford, Conn.

[21] Appl. No.: 301,952

[22] Filed: Sep. 7, 1994

[51] Int. Cl.[6] ........ B41J 2/085; H01G 5/00

[52] U.S. Cl. ........ 347/46; 361/283.1; 361/287; 361/290; 361/291

[58] Field of Search ........ 347/46; 361/290, 361/287, 277, 280, 291, 283.2, 283.4, 283.1

[56] References Cited

U.S. PATENT DOCUMENTS

| | | | |
|---|---|---|---|
| 3,681,600 | 8/1972 | Rigden et al. | 361/290 |
| 4,369,483 | 1/1983 | Shirakawa | 361/290 |
| 4,782,350 | 11/1988 | Smith et al. . | |
| 4,980,741 | 12/1990 | Temple | 257/154 |
| 5,038,184 | 8/1991 | Chiang et al. . | |
| 5,075,600 | 12/1991 | El-Hamamsy et al. | 361/290 |
| 5,544,001 | 8/1996 | Ichiya et al. | 361/233 |

FOREIGN PATENT DOCUMENTS

| | | | |
|---|---|---|---|
| 4411118 | 10/1992 | Germany | 361/283.4 |
| 1394236 | 5/1975 | United Kingdom | 361/283.1 |

*Primary Examiner*—Benjamin R. Fuller
*Assistant Examiner*—Juanita Stephens
*Attorney, Agent, or Firm*—Oliff & Berridge

[57] ABSTRACT

A mechanical capacitor includes a fixed electrode, a movable electrode separated from the fixed electrode by a gap, a spring attached to the movable electrode suspending it above the fixed electrode, opposing the fixed electrode and an insulator formed over either the fixed or the movable electrode in between the two electrodes. The movable electrode, the gap, the insulator and the fixed electrode form a mechanical capacitor. The capacitance of the mechanical capacitor is changed by applying a control voltage between the movable and the fixed electrodes. When a control voltage across the mechanical capacitor is increased, the movable electrode moves closer to the fixed electrode, which causes the mechanical capacitor capacitance to increase. When the control voltage across the mechanical capacitor is decreased, the movable electrode is moved farther away from the fixed electrode by the operation of the spring. This movement of the movable electrode away from the fixed electrode decreases the capacitance of the mechanical capacitor.

17 Claims, 9 Drawing Sheets

MECHANICAL CAPACITOR

BACKGROUND OF THE INVENTION

1. Field of the Invention

This invention relates to a mechanical capacitor and, more particularly, to a mechanical capacitor which is used as a switch to turn on and off an acoustic ink jet ejector.

2. Description of Related Art

A single acoustic ink jet printhead ejector 100 is shown in FIG. 1. A channel forming layer 110 is formed on a substrate 102. An ink channel 112 is formed in the channel forming layer 110. A Fresnel lens 108 is formed on the surface of the substrate 102 in the ink channel 112. An opening 122 is formed on the top surface 120 of the channel forming layer 110. During normal operation, ink fills the ink channel 112 forming an ink free-surface 114. A piezoelectric device 31, positioned on the opposite side of the substrate 102 from the ink channel 112, comprises two electrodes 32 and 104 and a piezoelectric layer 106. When a radio-frequency (RF) signal is applied by RF power source 34 between the electrodes 32 and 104, the piezoelectric device 31 generates acoustic energy in the substrate 102 directed toward the ink channel 112. The Fresnel lens 108 focuses the acoustic energy entering the ink channel 112 from the substrate 102 onto the ink free-surface 114. The ink in the ink channel 112 forms an ink mound 116 in the ink-free surface 114. The ink mound 116 eventually becomes an ink drop 118 moving toward a recording medium.

In conventional acoustic ink jet printheads, a PIN diode controls ink ejection by switching the RF signal on and off. The RF signal powers the PIN diode and the piezoelectric device 31, which are serially connected. In this circuit, the PIN diode functions as a capacitor switch for the piezoelectric device. When the PIN diode capacitance is increased above a threshold by increasing a control voltage to the PIN diode, the piezoelectric device 31 activates, causing an ink drop 118 to be ejected from the ink channel 112.

Normally, an acoustic ink jet printhead contains an array of the ejectors 100. Because PIN diodes cannot be manufactured on the same substrate as the piezoelectric device 31, the PIN diodes are manufactured separately, placed onto the printhead substrate and electrically connected to the printhead by wire bonding. Thus, manufacturing conventional printheads not only incurs undesirable assembly costs, but also prevents manufacturing of high density ejector printheads, since space must be allowed for the manual diode assembly steps.

SUMMARY OF THE INVENTION

This invention eliminates the undesirable assembly steps and allows greater ejector density by replacing the PIN diode with a mechanical capacitor. The mechanical capacitor comprises a substrate, a fixed electrode, a spring suspending a movable electrode opposing the fixed electrode to form a gap between the two electrodes, and an insulator formed over either the fixed or the movable electrode and positioned between the fixed and movable electrodes. This mechanical capacitor allows for easy integration into amorphous/poly/crystal silicon technology. The ability to form the mechanical capacitor on a common substrate along with the piezoelectric device allows the production of a dense array of piezoelectric device-mechanical capacitor pairs for a complete printhead without the need for any manual assembly.

This invention provides for an alternative to the PIN diode and other known variable capacitance devices. For the acoustic ink jet printhead of this invention, a piezoelectric device is connected in series with the mechanical capacitor and an RF source powers the series combination. A control voltage source, connected directly across the mechanical capacitor, modulates the capacitance of the mechanical capacitor. The control voltage activates the acoustic ink jet printhead ejector 100 by increasing the capacitance of the mechanical capacitor above a threshold, and deactivates the acoustic ink jet printhead ejector 100 by decreasing the capacitance of the mechanical capacitor below the threshold.

These and other objects and advantages will become apparent from the following detailed description in connection with the drawings.

BRIEF DESCRIPTION OF THE DRAWINGS

The invention will be described in detail with reference to the following drawings, wherein.

DETAILED DESCRIPTION OF THE PREFERRED EMBODIMENTS

Figure 1:
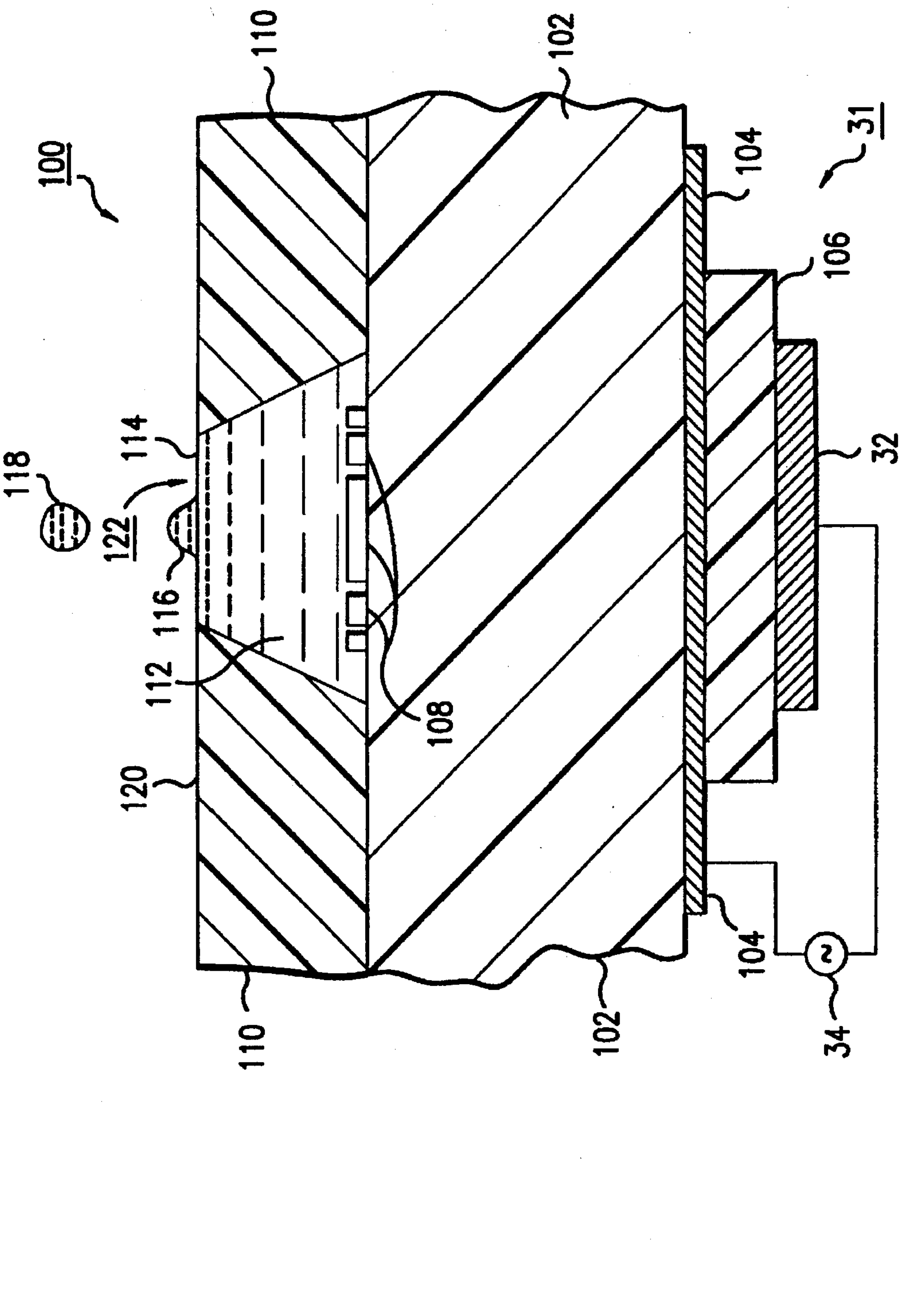
FIG. 1 is a cross-sectional view of an acoustic ink jet ejector.
Figure 2:
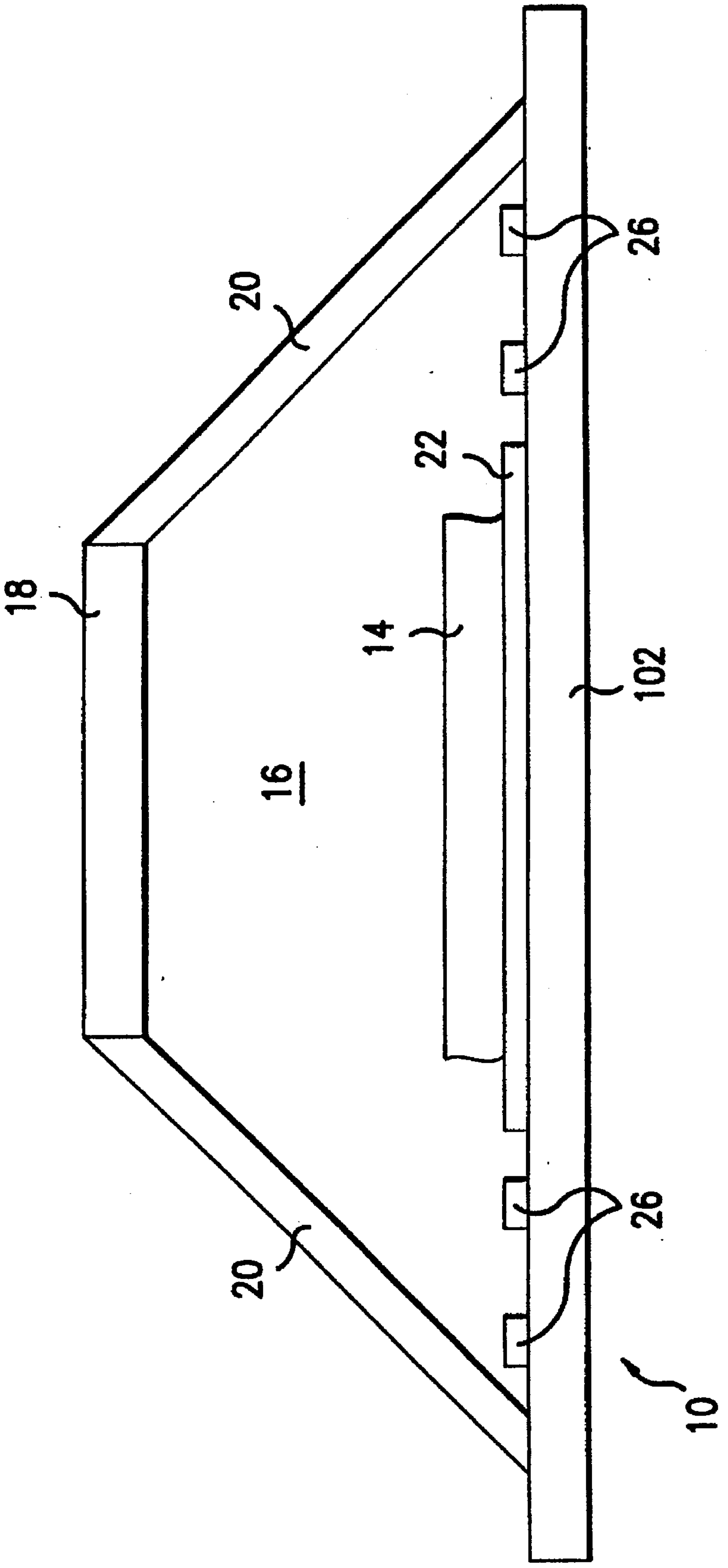
FIG. 2 is a front plan view of the mechanical capacitor.

FIG. 2 shows a first preferred embodiment of the mechanical capacitor 10. A fixed electrode 22 is formed over the substrate 102 and an insulator 14 is formed over the fixed electrode 22. A movable electrode 18 is separated from the insulator by a gap 16. Springs 20 are attached to each end of the movable electrode 18, suspending it above the insulator 14. The movable electrode 18 is suspended generally directly above the fixed electrode 22. Field rings 26 are also formed over the substrate 102 and surround the fixed electrode 22. The movable electrode 18, the gap 16, the insulator 14, the springs 20 and the fixed electrode 22 form the mechanical capacitor 10. A control voltage applied between the movable and the fixed electrodes 18 and 22 of the mechanical capacitor 10 controls the capacitance of the mechanical capacitor 10. An increase in the control voltage increases the capacitance of the mechanical capacitor 10 by moving the movable electrode 18 closer to the fixed electrode 22. This movement is caused by electrostatic attraction of the opposite charges placed on the movable and fixed electrodes by the control voltage. For example, when the control voltage causes the movable electrode 18 to be more positive relative to the fixed electrode 22, the positive charge within the movable electrode 18 attracts the negative charge within the fixed electrode 22. This attraction causes the movable electrode 18 to move closer to the fixed electrode 22 opposing the springs 20 until the force in springs 20 equals the electrostatic attraction force.

When the control voltage is decreased, the charge on the movable and fixed electrodes 18 and 22 decrease and the springs 20 move the movable electrode 18 farther away from the fixed electrode 22, decreasing the capacitance of the mechanical capacitor 10. Accordingly, the minimum capacitance of the mechanical capacitor 10 is set by the maximum possible separation of the movable and fixed electrodes 18 and 22. The maximum capacitance is set by the elastic constant K of the springs 20, the dielectric constant of the insulator 14 and how well the movable and the fixed electrodes 18 and 22 overlap or match when they are brought together.

When the insulator 14 over the fixed electrode 22 is formed from silicon dioxide ($SiO_2$), a maximum capacitance of 5 pF requires the movable and fixed electrodes 18 and 22 to each have an area of approximately $1.5\times10^{-8}$ $m^2$ (0.015 $mm^2$). At this maximum capacitance value, the movable electrode 18 may contact the insulator 14, thus eliminating the gap 16. The mechanical capacitor 10 may be a square having sides of approximately 120 μm. When the gap 16 is more than about 0.1 μm, the capacitance drops to below 1 pF. A range of 1–5 pF is normally required to turn the acoustic ink jet printhead ejector 100 on and off.

Figure 3:
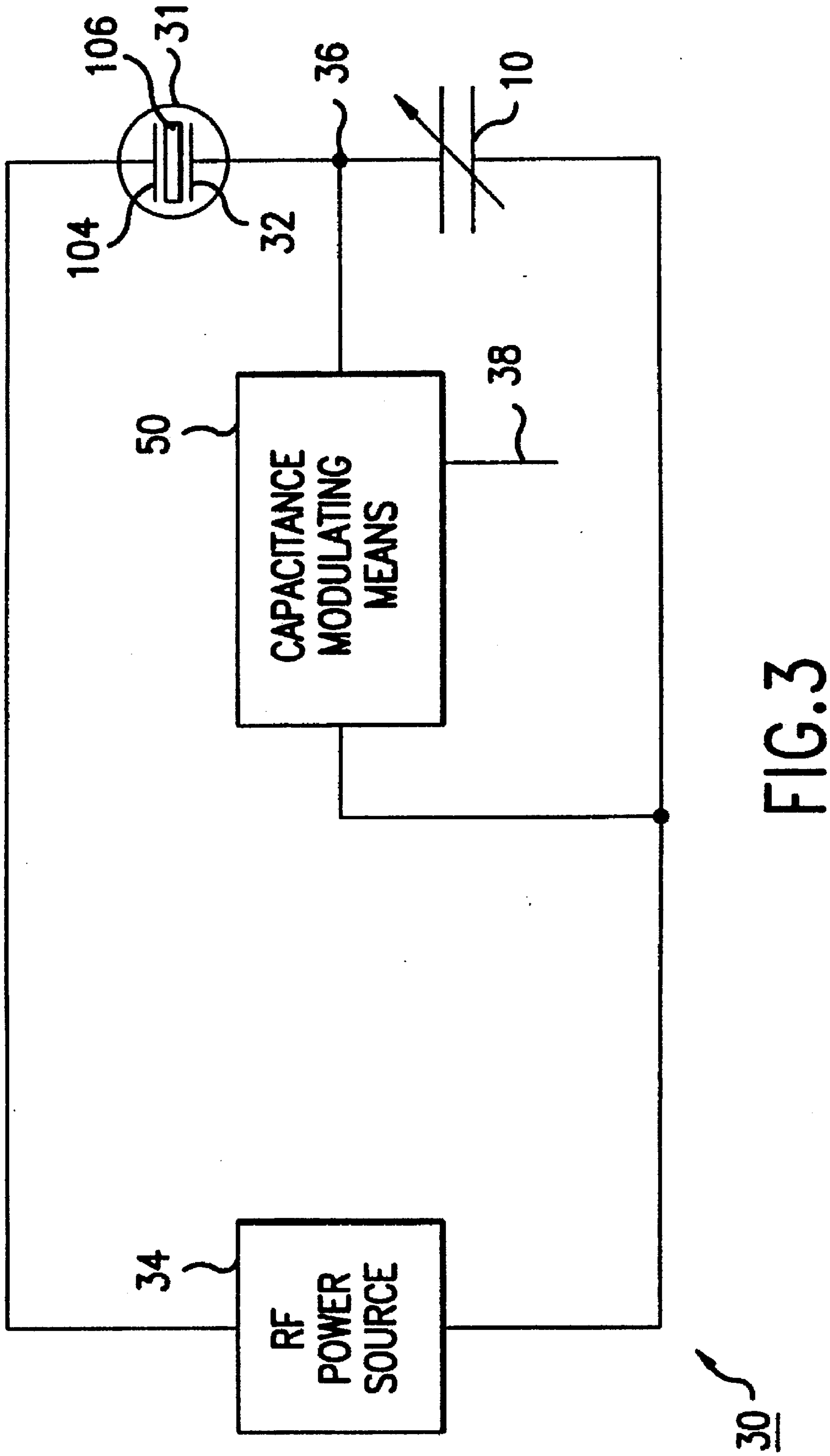
FIG. 3 is a circuit diagram of the mechanical capacitor in combination with the ejector, the RF power source and capacitance modulating means.
Figure 4B:
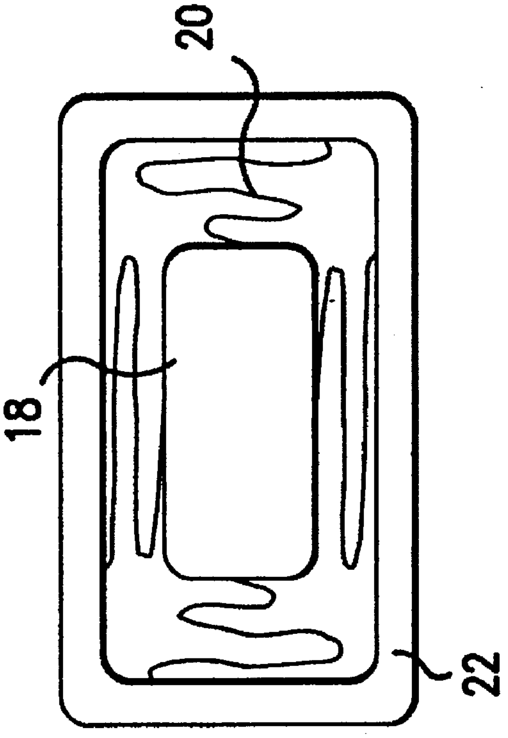
FIGS. 4*a* and 4*b* show the movable and fixed electrodes with square and round corners respectively.
Figure 4A:
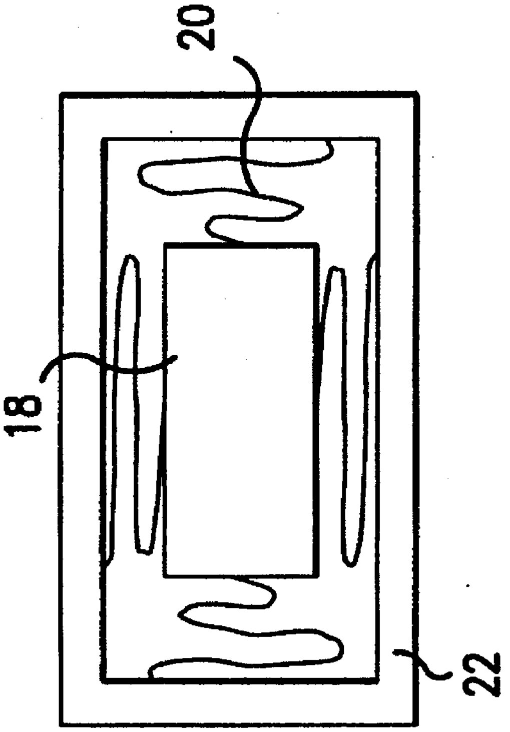
Figure 6:
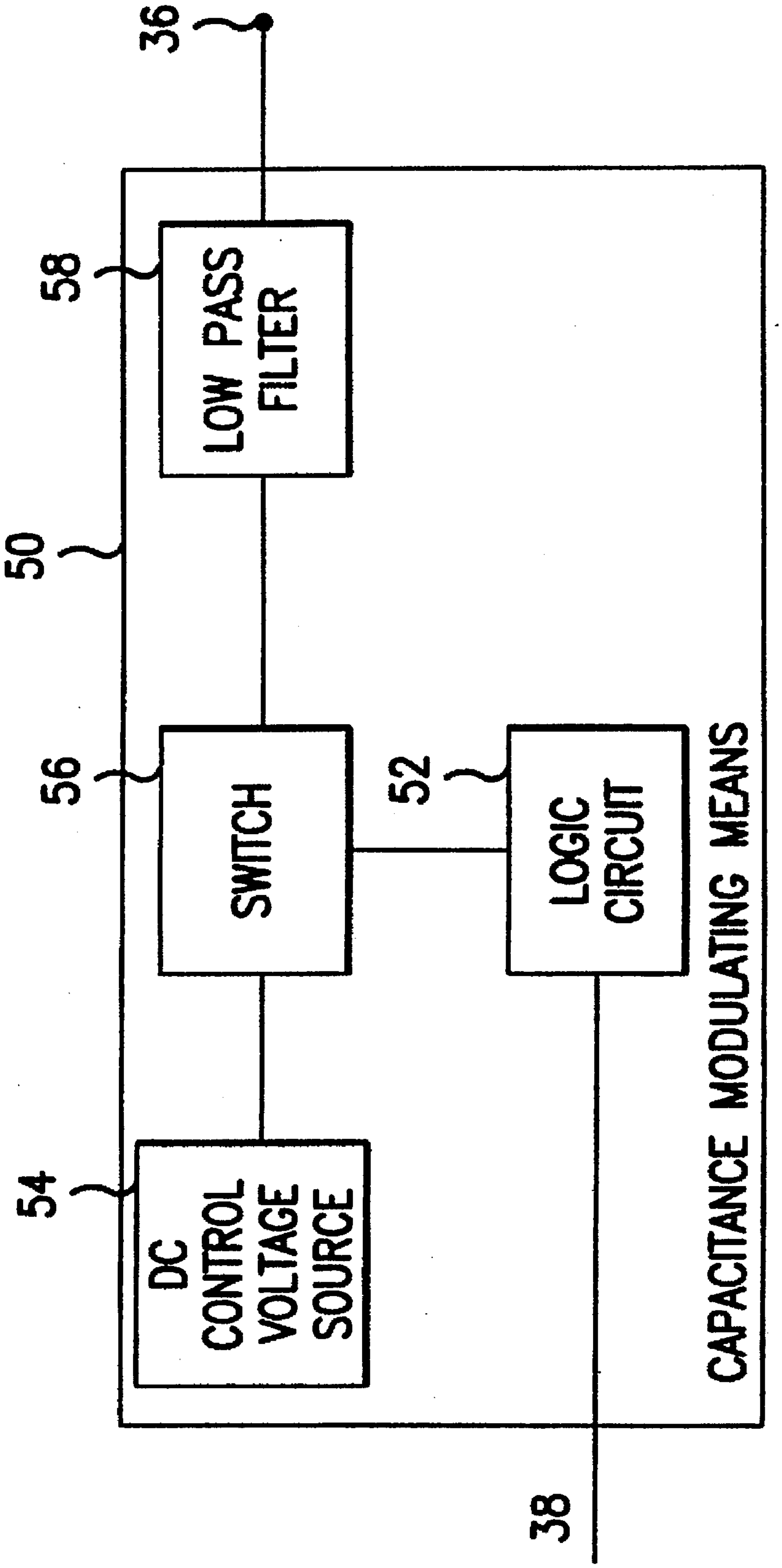
FIG. 6 is a block diagram of the capacitance modulating means.

FIG. 3 shows a circuit diagram for the acoustic ink jet printhead ejector 100 incorporating the mechanical capacitor 10. The piezoelectric device 31 of the acoustic ink jet ejector 100 is serially connected to the mechanical capacitor 10 at a node 36. An RF power source 34 is connected across the piezoelectric device 31 and mechanical capacitor 10 serial connection. A capacitance modulating means 50 is connected at node 36 across only the mechanical capacitor 10. The capacitance modulating means 50, as shown in FIG. 6 and discussed below, modulates the capacitance of the mechanical capacitor 10 by supplying a control voltage. The RF power source 34 powers the piezoelectric device 31 and the mechanical capacitor 10.

The field rings, 26, are an option which may be included in versions where the control or RF voltages are high enough to cause arcing or other electric breakdowns to occur. The field rings 26 may be held at a voltage potential that is intermediate between the voltage potential of the movable and fixed electrodes 18 and 22. This reduces the local fields at the edges of the movable and fixed electrodes 18 and 22.

Figure 8:
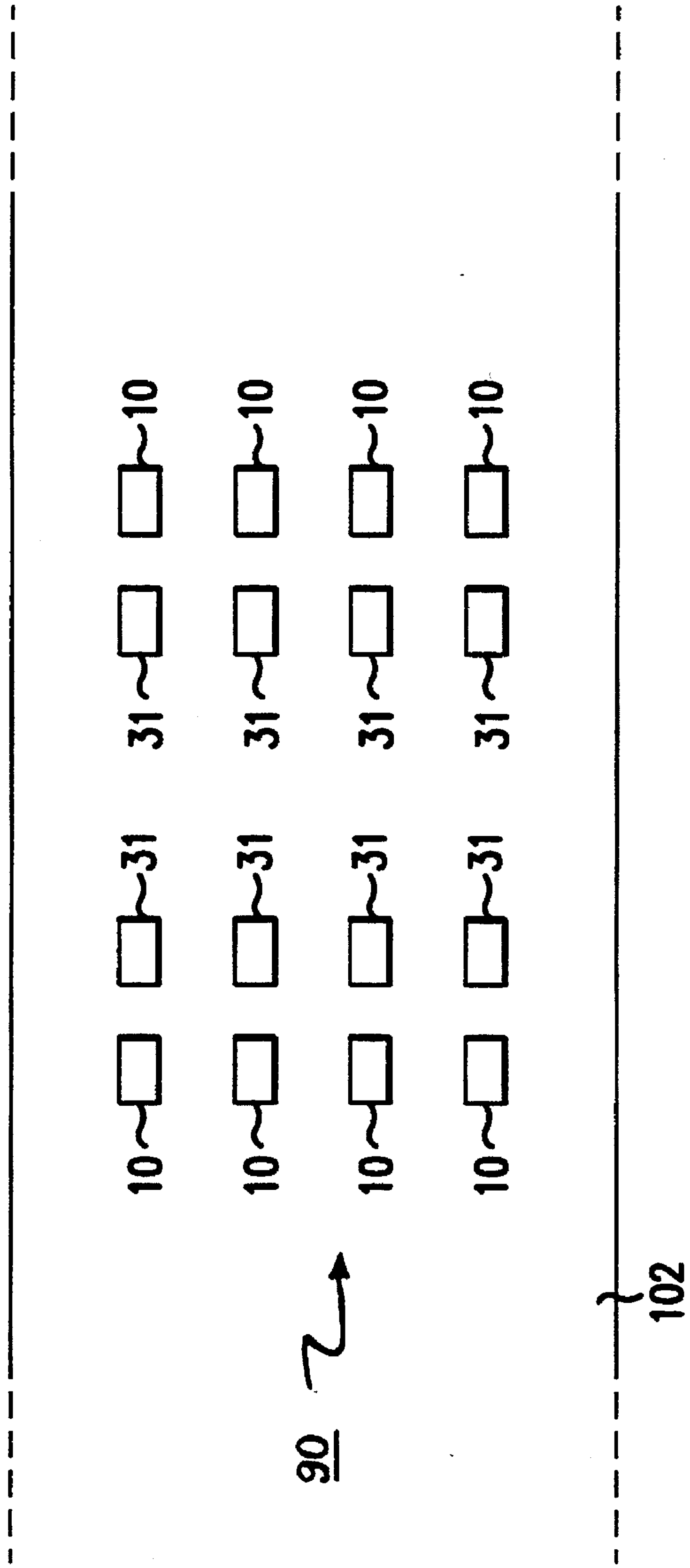
FIG. 8 shows an array of piezoelectric device-mechanical capacitor pairs.

For this first preferred embodiment of the circuit, the RF power source 34 generates 150 V pulses at a frequency of about 100 MHz. The mechanical capacitor electrodes 18 and 22 may be made of highly conductive materials to support this high frequency operation. For an array 90 of mechanical capacitors 10, as shown in FIG. 8, the RF power source 34 powers all of piezoelectric device 31/mechanical capacitor 10 pairs in parallel while the capacitance modulating means 50 modulates each mechanical capacitor 10 individually for specific ejector control.

Figure 5:
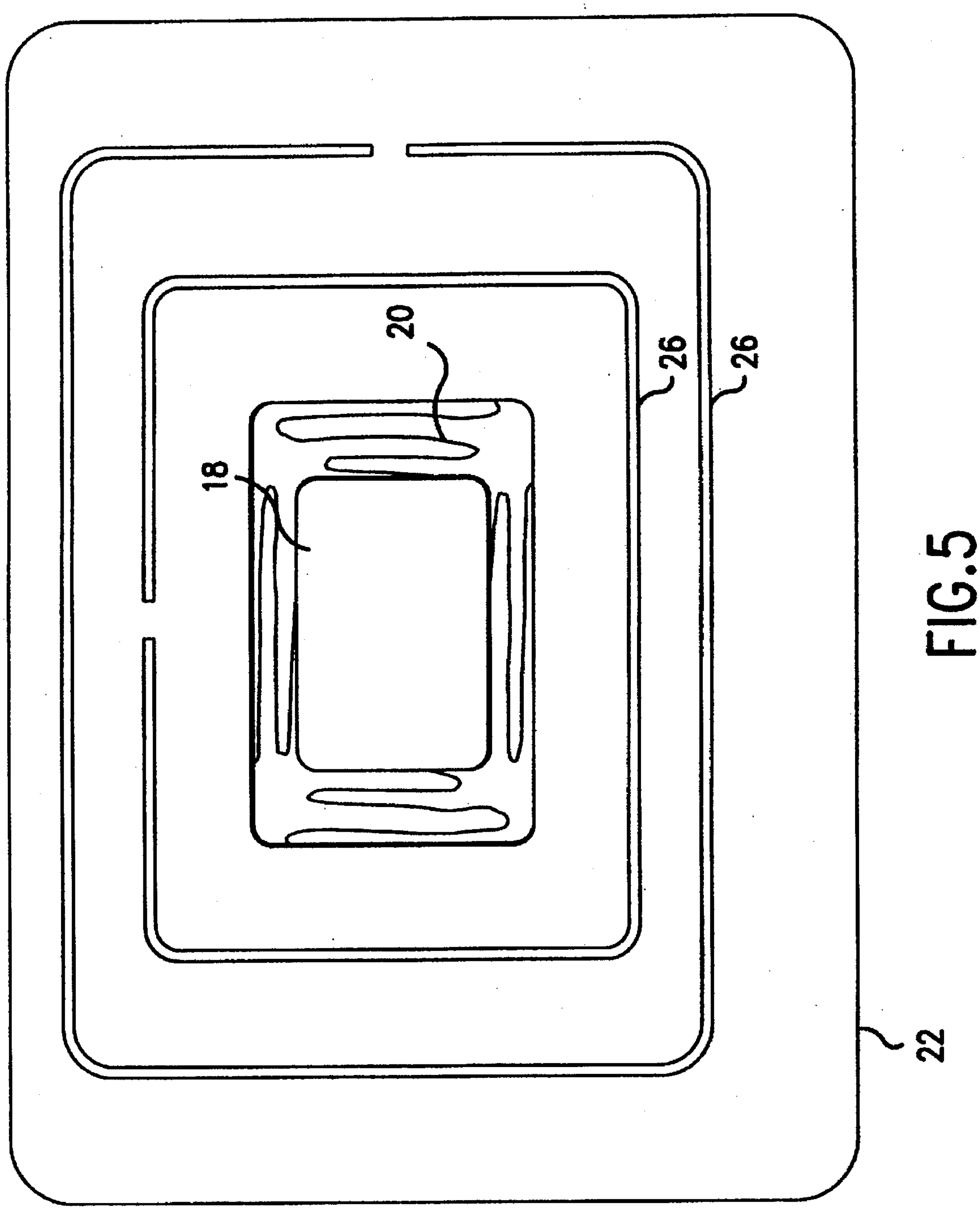
FIG. 5 shows the mechanical capacitor field rings.

The movable electrode 18 does not respond to the 150 V/100 MHz signal. The spring constant K (mechanical capacitance C) of springs 20 and the mass (mechanical inertance L) of the movable electrode 18 form a mechanical LC circuit which acts as a low pass filter to the high frequency electrostatic attractive force generated by the RF power source 34 in the mechanical capacitor 10, thus preventing any physical displacement of the movable electrode 18 in response to the 100 MHz pulses from the RF power source 34. The lack of movement of the mechanical capacitor 10 in response to the RF power source 34 preserves the spring 20 from fatigue and thus ensures a long life for the mechanical capacitor 10. Likewise, rounding the corners of the electrodes 18 and 22, as shown in FIG. **4*b*, and/or adding the field rings 26 around the fixed electrode 22, as shown in FIGS. 2 and 5, further increases the mechanical capacitors 10** life time by reducing possible electric arcing.

The mechanical capacitor's mechanical construction and compatibility with available integrated circuit fabrication techniques present attractive features that can be used in many other applications. For example, mechanical capacitor switches may be used to control the production of ultrasound in sonar transmitters. In that application, the ability to produce a two dimensional array in a monolithic fashion is an advantage. Similarly, mechanical capacitor switches can be used to aim the direction of a two dimensional array of radio antenna in the fashion of a phased array antenna.

FIG. 6 shows a preferred embodiment of the capacitance modulating means 50. The logic circuit 52 activates the acoustic ink jet printhead ejector 100 by turning on the switch 56. When the switch 56 is on, it passes the output of the DC control voltage source 54 to the low pass filter 58. The low pass filter 58 passes the output of the DC control voltage source 54 to the node 36, which causes the capacitance of the mechanical capacitor 10 to increase above a threshold value, causing an ink drop 18 to eject. The logic circuit 52 deactivates the acoustic ink jet printhead ejector 100 by turning off the switch 56. This disconnects the output of the DC control voltage source 54 from the low pass filter 58 and the node 36, which in turn causes the capacitance of the mechanical capacitor 10 to fall below the threshold value. The low pass filter 58 protects the switch 56, the logic circuit 52 and the control voltage source 54 from possible damage caused by the 150 V/100 MHz RF power signal from the RF power source 34. The logic circuit 52 receives commands from an external control unit (not shown) of a printer through signal line 38. The external control unit coordinates the activation of all the ejectors of a printhead for a printing operation. The logic circuit 52 individually executes these commands to separately control each of the ejectors 100.

Figure 7:
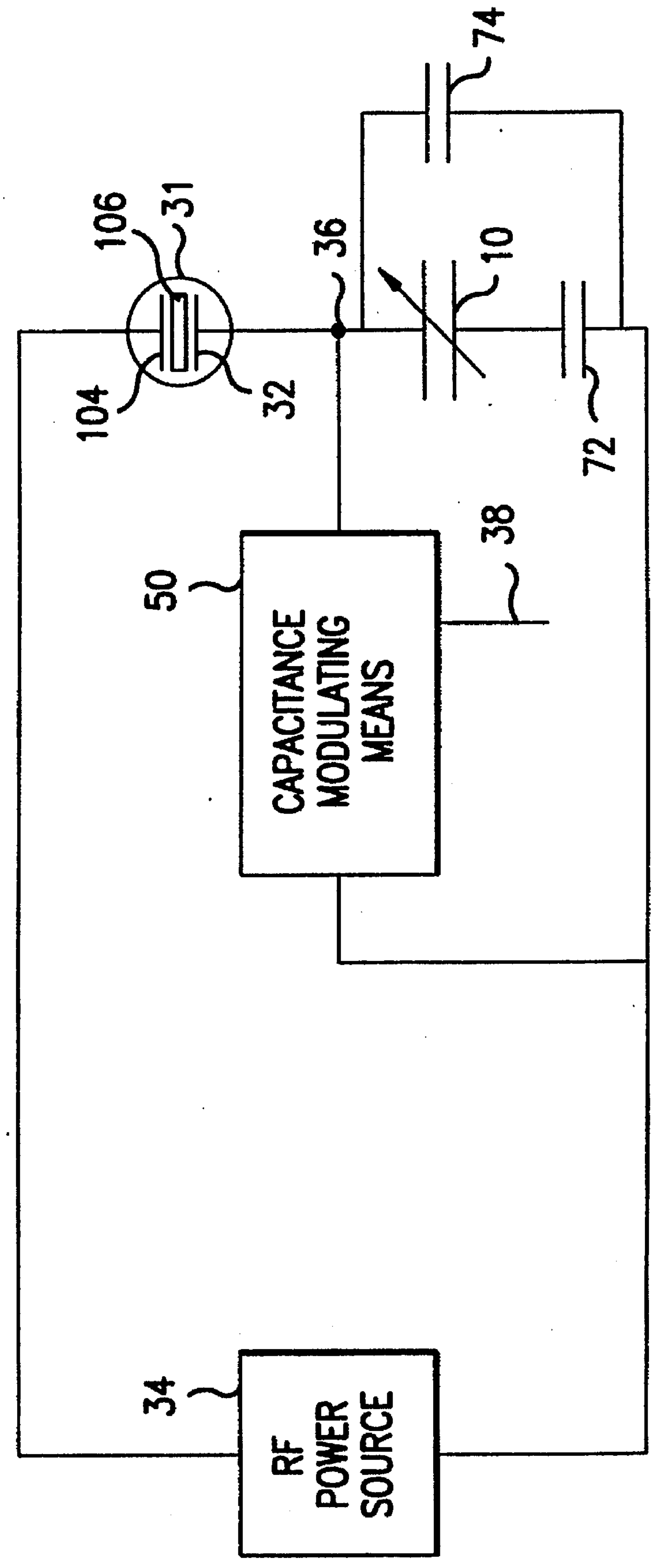
FIG. 7 shows a mechanical capacitor with a maximum capacitance capacitor and a minimums capacitance capacitor.

FIG. 7 shows a second preferred embodiment for adjusting the capacitance value of the mechanical capacitor 10. A maximum capacitance (max-c) capacitor 72 is connected in series with the mechanical capacitor 10 and a minimum capacitance (min-c) capacitor 74 is connected in parallel with the serially connected mechanical capacitor 10 and max-c capacitor 72. The added fixed capacitances of the max-c capacitor 72 and the min-c capacitor 74 sets the top and bottom of the range of the capacitance values for the mechanical capacitor 10.

A dense acoustic ink jet printhead can be constructed by forming an array of the mechanical capacitors 10 and the piezoelectric devices 31 on the printhead substrate 102, as shown in FIG. 8. The spring constant K of spring 20 can be controlled over several orders of magnitude, allowing the control voltage for the mechanical capacitor 10 to be in the 5 V to 20 V range. This voltage range allows the mechanical capacitor 10 to be easily integrated into the acoustic ink jet printhead using amorphous/poly/crystal silicon technology. In addition, well known micromechanical fabrication techniques can be used to easily fabricate the movable electrode 18, as shown in FIG. 9, so that no manual assembly steps are needed for manufacturing a dense array of the acoustic ink jet printer ejectors 100.

Figure 9:
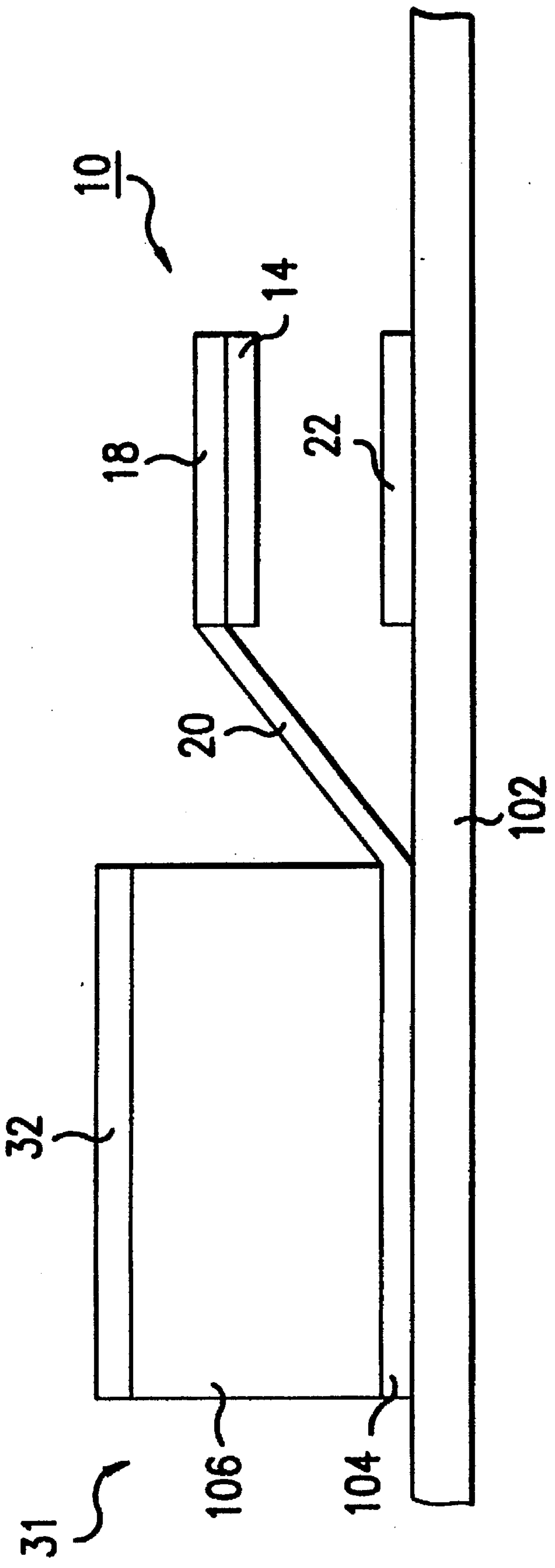
FIG. 9 shows a micromechanical embodiment of the piezoelectric device-mechanical capacitor pair.

FIG. 9 shows the piezoelectric device 31 and the mechanical capacitor 10 manufactured together on the same substrate 102. The piezoelectric electrode 104 is formed by micromechanical techniques into the spring 20 and further extended to become the movable electrode 18 of the mechanical capacitor. The mechanical capacitor insulator 14 is formed on the bottom side of the movable electrode 18 instead of over the fixed electrode 22 as shown in FIG. 2. The substrate 102 is an insulating material such as glass. Thus, the fixed electrode 22 is electrically isolated from the movable electrode 18 and the piezoelectric electrode 104. In operation, an RF signal is connected across the electrodes 22 and 32 while the capacitor modulating means is connected across electrodes 22 and 104.

This invention is not limited to the embodiments as described above, and various modifications may be made without departing from the subject matter of this invention. For example, the fixed electrode 22 may be suspended by another spring and be movable. The fixed electrode 22 may be formed perpendicular to the substrate surface instead of parallel to the substrate surface and the movable electrode 18 is also perpendicular to the substrates surface and the movement of at least one of the movable and the fixed electrodes is approximately parallel to the substrate surface. Another possibility is that both movable and fixed electrodes 18 and 22 of the mechanical capacitor switch are movable. FIG. 2 depicts one embodiment where the movable electrode 18 is in a rest position suspended above the fixed electrode 22 by spring 20. Another embodiment is having the rest position where the movable electrode 18 is pressed against the insulator 14 and the fixed electrode 22 by the spring 20 and the gap 16 is substantially eliminated. The control voltage increases the gap 16 by placing like charges on both the movable and fixed electrodes 18 and 22 causing the movable electrode 18 to push against the spring 20 due to the repelling force of like charges.

What is claimed is:

1. A mechanical capacitor device, comprising:

a substrate;

a fixed electrode disposed on the substrate;

a movable electrode, wherein the movable electrode and the fixed electrode form a capacitor;

at least one support disposed on the substrate;

a voltage applying device for applying a voltage between the fixed electrode and the movable electrode;

the movable electrode being supported by the at least one support so that the movable electrode opposes the fixed electrode, the movable electrode being separated from the fixed electrode by a distance based on the voltage applied by the voltage applying device between the movable electrode and the fixed electrode; and an insulator disposed over one of the fixed electrode and the movable electrode between the fixed and the movable electrodes, wherein a capacitance of the capacitor changes based on the voltage applied between the fixed electrode and the movable electrode.

2. The mechanical capacitor device of claim 1, wherein the at least one support comprises:

at least one spring attached to at least one of the movable electrode and the fixed electrode, wherein the at least one spring sets the movable electrode a second distance from the fixed electrode, the at least one spring urging the movable and fixed electrodes to be separated by the second distance when the movable and fixed electrodes are separated by a third distance different from the second distance.

3. The mechanical capacitor device of claim 1, wherein said fixed and movable electrodes are made of an electrically conductive material that permits the fixed and movable electrodes to operate at high frequencies.

4. The mechanical capacitor device of claim 1, wherein the movable electrode has rounded corners.

5. The mechanical capacitor device of claim 3, further comprising field rings disposed over the substrate and around the fixed electrode.

6. An acoustic ink jet ejector control device, comprising:

an acoustic ink jet ejector having an ejector substrate and a piezoelectric device disposed over the ejector substrate;

a mechanical capacitor device disposed over the ejector substrate and electrically connected in series with the piezoelectric device, the mechanical capacitor device switching the ejector on and off;

a radio frequency power source coupled to the piezoelectric device and the mechanical capacitor, the radio frequency power source supplying a radio frequency power signal to the piezoelectric device and the mechanical capacitor; and capacitance modulating means for modulating a capacitance of the mechanical capacitor.

7. The acoustic ink jet ejector control device of claim 6, further comprising:

a first capacitor connected in series with the mechanical capacitor device; and a second capacitor connected in parallel with the serially connected first capacitor and the mechanical capacitor device.

8. A printer including an acoustic ink jet ejector printhead, comprising:

a substrate;

a plurality of piezoelectric devices formed over the substrate;

a plurality of mechanical capacitors formed over the substrate, wherein each mechanical capacitor of the plurality of mechanical capacitors is paired with a corresponding one of the plurality of piezoelectric devices, each mechanical capacitor connected in series with the corresponding piezoelectric device;

an a radio frequency power source connected to the plurality of serially connected piezoelectric devices and mechanical capacitors; and capacitance modulating means for modulating a capacitance of each of the plurality of mechanical capacitors, the capacitance modulating means independently controlling each one of the plurality of mechanical capacitors.

9. The printer including an acoustic ink jet ejector printhead of claim 8, wherein each mechanical capacitor of the plurality of mechanical capacitors comprises:

a mechanical capacitor device;

a first capacitor connected in series with the mechanical capacitor device; and a second capacitor connected in parallel with the serially connected mechanical capacitor device and the first capacitor.

10. The printer including an acoustic ink jet ejector printhead of claim 8, wherein each of the plurality of mechanical capacitors comprises a mechanical capacitor device.

11. A mechanical capacitor device of claim 10, comprising:

a substrate;

a fixed electrode disposed on the substrate;

a movable electrode;

at least one support disposed on the substrate;

a voltage applying device for applying a voltage between the fixed electrode and the movable electrode;

the movable electrode supported by the at least one support so that the movable electrode opposes the fixed electrode, the movable electrode being separated from the fixed electrode by a distance based on the voltage applied by the voltage applying device between the movable electrode and the fixed electrode; and an insulator disposed over one of the fixed electrode and the movable electrode between the fixed and the movable electrodes.

12. The mechanical capacitor device of claim 11, wherein the at least one support comprises:

at least one spring attached to at least one of the movable electrode and the fixed electrode, wherein the at least one spring sets the movable electrode a second distance from the fixed electrode, the at least one spring urging the movable and fixed electrodes to be separated by the second distance when the movable and fixed electrodes are separated by a third distance different from the second distance.

13. The mechanical capacitor device of claim 11, wherein said fixed and movable electrodes are made of an electrically conductive material that permits the fixed electrode and movable electrode to operate at high frequencies.

14. The mechanical capacitor device of claim 11, wherein the movable electrode has rounded corners.

15. The mechanical capacitor device of claim 13, further comprising field rings disposed over the substrate around the fixed electrode.

16. The printer including an acoustic ink jet ejector printhead of claim 8, wherein the plurality of serially connected piezoelectric devices and mechanical capacitors are arranged into an array.

17. The printer including an acoustic ink jet ejector printhead of claim 8, wherein the array comprises one of at least a linear array, a hexagonal array, and a rectangular array.

* * * * *